United States Patent
Kwon et al.

(10) Patent No.: US 7,509,522 B2
(45) Date of Patent: Mar. 24, 2009

(54) REMOVABLE STORAGE DEVICE AND METHOD OF DATA RECOVERY USING THE SAME

(75) Inventors: Moon-sang Kwon, Seoul (KR); Bum-Soo Kim, Seongnam-si (KR); Young-joon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 11/282,748

(22) Filed: Nov. 21, 2005

(65) Prior Publication Data
US 2006/0112224 A1 May 25, 2006

(30) Foreign Application Priority Data
Nov. 22, 2004 (KR) ............... 10-2004-0095807

(51) Int. Cl.
*G06F 11/00* (2006.01)
(52) U.S. Cl. .................. 714/5; 711/115
(58) Field of Classification Search .......... 714/5, 714/6, 2, 42, 54; 711/115, 161, 182, 103
See application file for complete search history.

(56) References Cited

U.S. PATENT DOCUMENTS

| 5,175,842 | A | * | 12/1992 | Totani | 711/161 |
| 5,469,573 | A | * | 11/1995 | McGill et al. | 717/127 |
| 5,539,914 | A | * | 7/1996 | Fry et al. | 710/7 |
| 5,734,894 | A | * | 3/1998 | Adamson et al. | 707/200 |

FOREIGN PATENT DOCUMENTS

| JP | 03-094352 A | 4/1991 |
| JP | 04-114219 A | 4/1992 |

* cited by examiner

*Primary Examiner*—Dieu-Minh Le
(74) *Attorney, Agent, or Firm*—Sughrue Mion, PLLC

(57) ABSTRACT

Provided are a portable storage device and a method of data recovery using the same, in which when the integrity of the recorded data is damaged, the integrity of the recorded data can be easily recovered. The portable storage device includes a memory unit that stores predetermined recovery information for the recorded data, a determining unit that determines whether a device that accesses the recorded data supports the stored recovery information, and a control unit that selectively recovers the recorded data using the stored recovery information based on a result of the determination.

12 Claims, 5 Drawing Sheets

REMOVABLE STORAGE DEVICE AND METHOD OF DATA RECOVERY USING THE SAME

CROSS-REFERENCE TO RELATED APPLICATION

This application claims priority from Korean Patent Application No. 10-2004-0095807 filed on Nov. 22, 2004 in the Korean Intellectual Property Office, the disclosure of which is incorporated herein by reference in its entirety.

BACKGROUND OF THE INVENTION

1. Field of the Invention

Apparatuses and methods consistent with the present invention relate to a portable storage device and a method of data recovery using the same, by which, when the integrity of recorded data is damaged, the integrity of the recorded data can be easily recovered.

2. Description of the Related Art

In general, electronic devices, such as home appliances, communication devices, and set-top boxes, use portable storage media for storing and processing data. Examples of portable storage media include hard disc drives, floppy disks, universal serial bus (USB) flash drives (UFDs), secure digital (SD) cards, memory sticks, multimedia memory cards (MMCs), and compact flash cards.

Referring to FIG. 1, a portable storage medium 10 is connected to a host device 20 by being inserted into a slot 21 formed in the host device 20. Once connected to the host device 20, the portable storage medium 10 receives data from the host device 20 and stores the data. The host device 20 includes a file system which stores data in the portable storage medium 10 as directories and files and manages the directories and the files, and stores the file system in the portable storage medium 10 together with the data.

To represent simple data as meaningful data, that is, from binary data of 0 and 1 to data in the form of, for example, a file or a directory, a file system is processed for obtaining abstract data, e.g., a volume, a data block map, data blocks, directories and files. A file system operation refers to an operation of indexing and modifying the abstract data processed in the file system.

The file system operation includes processes for updating the abstract data. Integrity of the file system can be ensured only when all processes of the file system operation are entirely performed or any process of the file system operation is not performed at the time of the file system operation.

If a power supply is suddenly interrupted or the portable storage medium 10 is separated from the host device 20 during the file system operation, a possibility of damaging the integrity of the file system increases due to abnormal termination of the file system operation. Thus, there is a need for a scheme for recovering the integrity of the file system when the power supply is interrupted or the portable storage medium 10 is separated from the host device 20 before completion of the file system operation.

To recover the integrity of the file system, the host device 20 usually records predetermined recovery information in the portable storage medium 10. Thereafter, if the integrity of the file system of the portable storage medium 10 is damaged, the host device 20 recovers the file system using the recorded recovery information, thereby recovering the integrity of the file system.

FIG. 2 is a flowchart illustrating a method for recording recovery information in the portable storage medium 10 by the host device 20 according to prior art.

As shown in FIG. 2, the host device 20 records data and a file system in the portable storage medium 10 through a file system operation in step S10.

When integrity of the file system is damaged due to occurrence of an unexpected event during the file system operation, the host device 20 records recovery information in a predetermined region of the portable storage medium 10 to recover the integrity of the file system in step S20.

At this time, the host device 20 records a logging method or an image of the file system in the portable storage medium 10, thereby recovering the integrity of the file system.

When a host device connected with the portable storage medium 10 is changed, the new host device recovers the integrity of the file system using recovery information recorded in the portable storage medium 10.

However, if the new host device does not support the recovery information recorded in the portable storage medium 10 or uses another type of recovery information, it is difficult for the new host device to recover the damaged integrity of the file system of the portable storage medium.

Thus, there is a need for a method for securing the integrity of the file system of the portable storage medium 10 even when the new host device does not support the recovery information recorded in the removable recording medium 10.

Japanese Patent Publication No. 1991-094352 discloses a technique in which when a damaged region of data is generated due to a power failure during recording with respect to an external recording medium, an interrupt signal is transmitted at the time of interruption of the power supply, the start through the end of a predetermined unit of data is checked, and re-recording is performed on the damaged region through the supply of an independent power source using the check information. However, this technique involves re-writing damaged data when the same host device records data in the external recording medium, and thus it is difficult for another host device to record damaged data in the external recording medium.

SUMMARY OF THE INVENTION

The present invention provides a portable storage medium and a method for recovering recorded data using the same, in which the integrity of the recorded data can be recovered regardless of whether a host device connected with the portable storage medium supports a recovering method to recover the recorded data. Here, the data comprises at least one of data and a file system which stores and manages the -data in a form of files and directories.

The above stated aspects as well as other aspects, features and advantages, of the present invention will become clear to those skilled in the art upon review of the following description.

According to an aspect of the present invention, there is provided a portable storage device including a memory unit, a determining unit, and a control unit. The memory unit stores predetermined recovery information for recorded data. The determining unit determines whether a device that accesses the recorded data supports the stored recovery information. The control unit selectively recovers the recorded data using the stored recovery information based on a result of the determination.

According to another aspect of the present invention, there is provided a method for recovering recorded data using a portable storage device, the method includes determining whether a device that accesses the recorded data supports predetermined recovery information for the recorded data, and recovering the recorded data using the recovery information based on a result of the determination by selectively causing a device that has the recorded data or the device that accesses the recorded data to recover the recorded data.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

Figure 1:
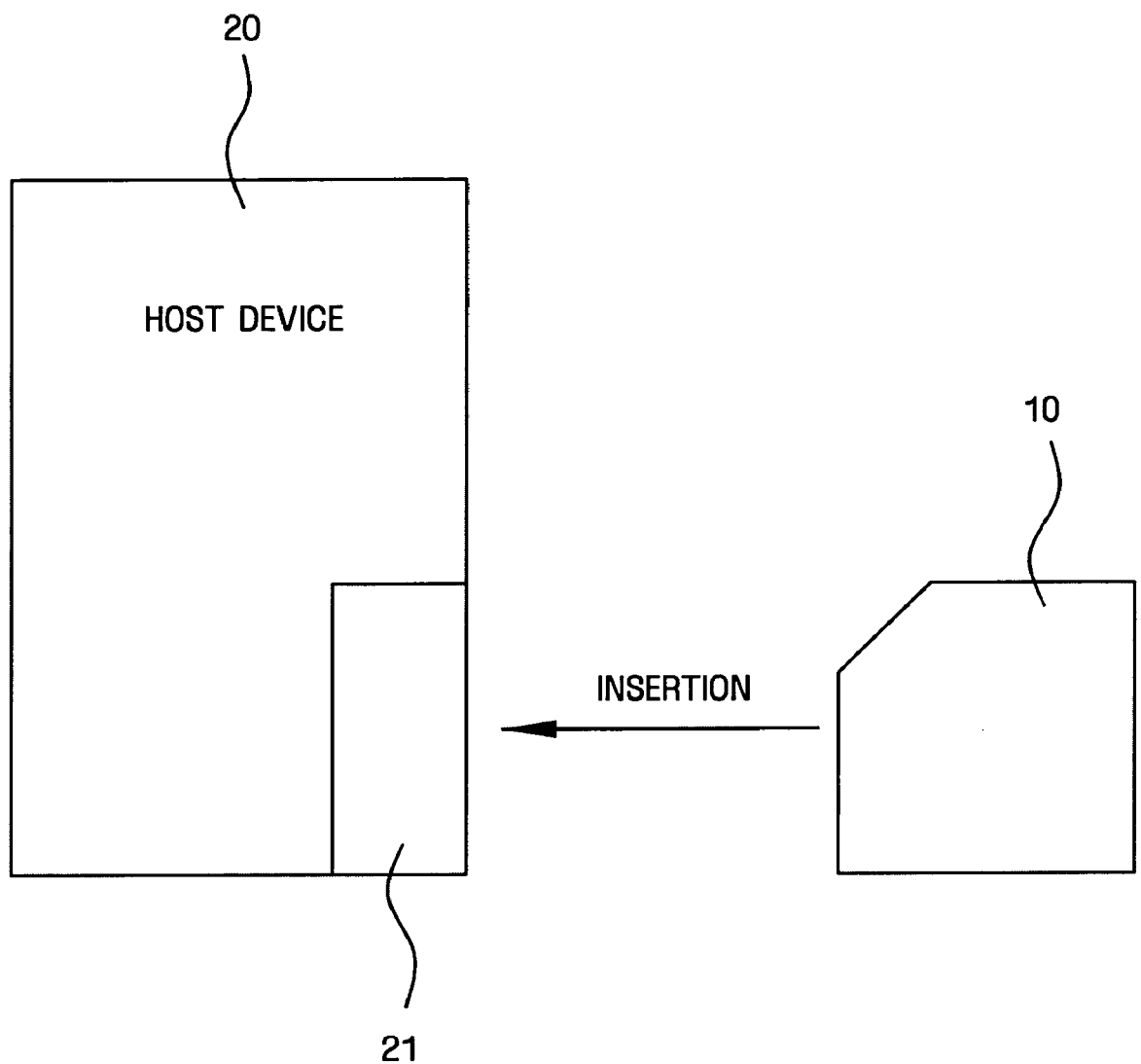
FIG. 1 illustrates a portable storage medium connected to a host device.

The present invention will now be described more fully with reference to the accompanying drawings, in which exemplary embodiments of this invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 3:
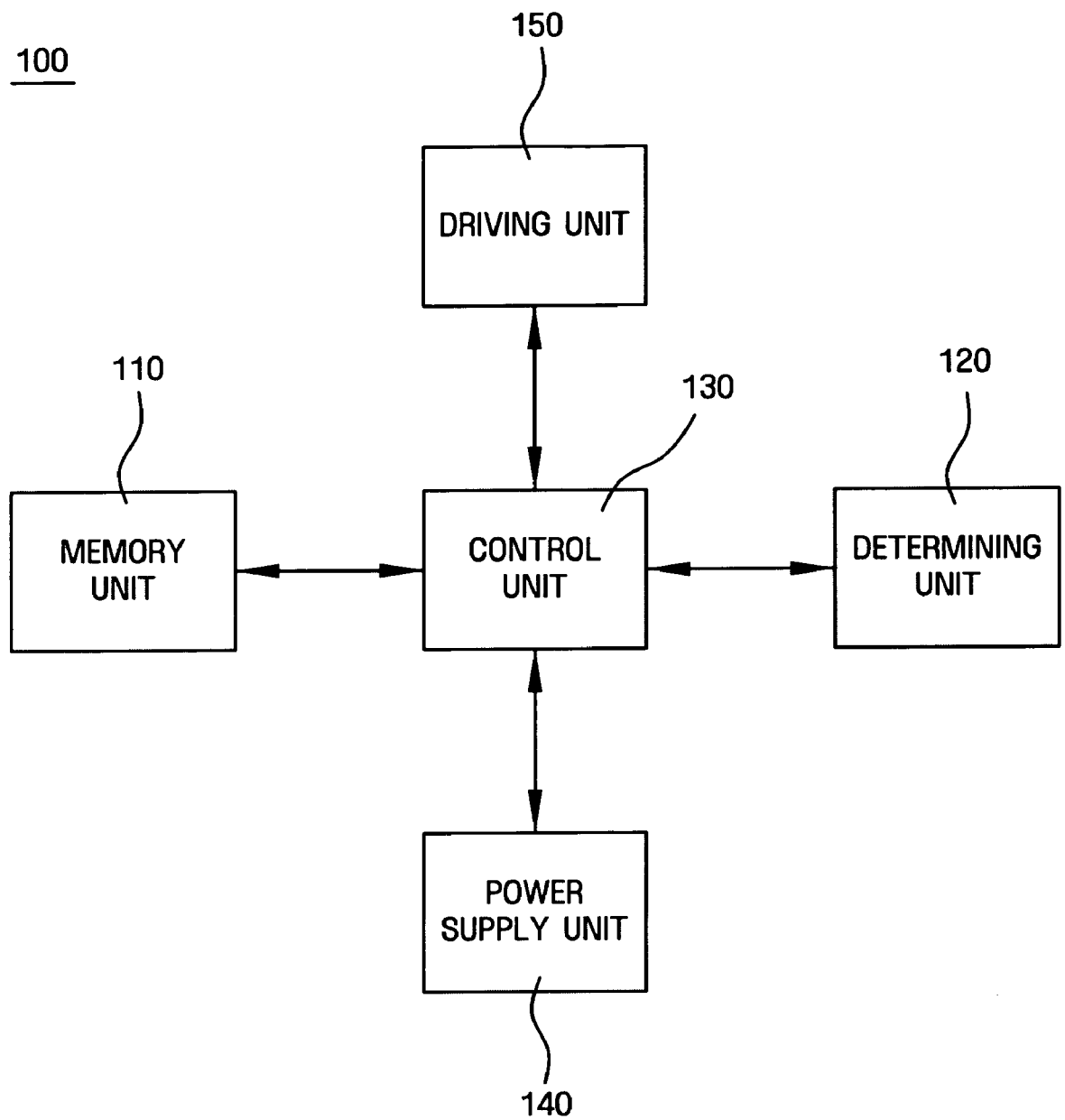
FIG. 3 illustrates a portable storage device according to an exemplary embodiment of the present invention.

FIG. 3 illustrates a portable storage device according to an exemplary embodiment of the present invention.

Referring to FIG. 3, a portable storage device 100 according to an exemplary embodiment of the present invention includes a memory unit 110, a determining unit 120, and a control unit 130. The memory unit 110 stores recovery information used to recover the integrity of recorded data by recovering the data. The determining unit 120 records data in the portable storage device 100. When the portable storage device 100 is connected to a device that accesses the recorded data, the determining unit 120 determines whether the connected device supports the recovery information stored in the memory unit 110. The control unit 130 selectively recovers the integrity of the recorded data, by recovering the recorded data using the recovery information stored in the memory unit 110 based on a result of the determination.

The portable storage device may further include a power supply unit 140 that supplies power to the portable storage device 100 from the connected device and a driving unit 150 that drives predetermined firmware using the supplied power.

The portable storage device 100 may also include a file system that stores and manages the recorded data in the form of files and directories. To express meaningful data such as files or directories with bits 0 and 1, the file system processes bits 0 and 1 into abstract data such as volumes, data block maps, data blocks, directories, and files.

More specifically, the file system names files in a computer and indicates where the files should be logically located for storage or retrieval. For example, operating systems based on DOS, Windows, OS/2, Macintosh, and Unix have a file system in which files are hierarchically located. The files are located in directories (folders after Windows 95) or sub-directories in a hierarchical structure. The file system has a rule in naming the files. The rule includes the length limit of file names and letters that can be used. Some file systems also limit the length of a filename extension. The file system also includes a format to set a path to a file through a directory structure.

A file system operation may include various processes for updating abstract data stated above. At this time, the integrity of the file system can be ensured only when all processes of the file system operation are entirely performed or any process of the file system operation is not performed. Thus, if an unexpected event occurs during the file system operation, the integrity of the file system is damaged. Accordingly, how the portable storage device 100 recovers a file system thereby recovering integrity of the file system is described herebelow.

The memory unit 110 may store recovery information used to recover the integrity of the file system by recovering the file system when the integrity of the file system is damaged due to occurrence of an unexpected event during a file system operation. The recovery information may be recorded by a device connected with the portable storage device 100 and includes, but is not limited to, logging information and file system images.

Here, the memory unit 110 may be, but is not limited to, a cache memory, a read-only memory (ROM), a programmable ROM (PROM), an erasable PROM (EPROM), an electrical EPROM (EEPROM), a flash memory, a static random access memory (SRAM), or a dynamic random access memory (DRAM).

The determining unit 120 determines whether a device connected with the portable storage device 100 supports the recovery information stored in the memory unit 110 to allow the connected device to recover the integrity of the file system, by recovering the file system using the recovery information, only when the recovery information is determined to be supported by the connected device.

Figure 4:
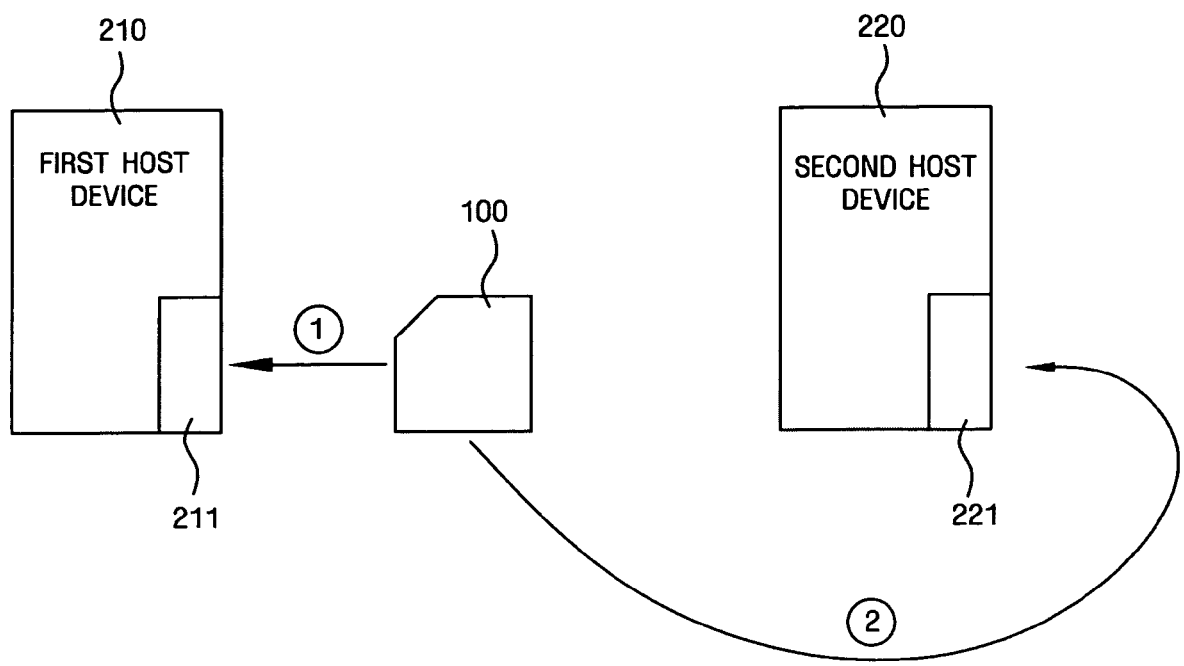
FIG. 4 illustrates a plurality of host devices connected with a portable storage device according to an exemplary embodiment of the present invention.

More specifically, as shown in FIG. 4, when the portable storage device 100 is connected to a second host device 220 (②) after the portable storage device 100 is connected to a first host device 210, and data, a file system and recovery information are recorded in the portable storage device 100 (①), the second host device 220 can recover the file system, thereby recovering the integrity of the file system, using the recovery information recorded in the portable storage device 100. At this time, when the second host device 220 supports the recovery information used in the first host device 210, the integrity of the file system can be recovered by recovering the file system using the recovery information. However, when the second host device 220 supports recovery information of a type that is different from the first host device 210, it is difficult to recover the integrity of the file system of the portable storage device 100 by recovering the file system.

At this time, the portable storage device 100 may be inserted into a first slot 211 of the first host device 210 and a second slot 221 of the second host device 220 to connect with the first host device 210 and the second host device 220.

When the first host device 210 and the second host device 220 support different types of recovery information and thus, it is difficult to recover the file system, thereby recovering the integrity of the file system, using the recovery information stored in the memory unit 110, the control unit 130 can recover the integrity of the file system of the portable storage device 100, by recovering the file system using the recovery information stored in the memory unit 110.

More specifically, if the determining unit 120 determines that a new host device does not support the recovery information stored in the memory unit 110, once the portable storage device 100 is inserted into the new host device and the power is supplied, the control unit 130 drives the firmware through the driving unit 150 and recovers an error occurred in the file system of the portable storage device 100 using the recovery information stored in the memory unit 110, thereby recovering the integrity of the file system by recovering the file system.

Hereinafter, a method for recovering integrity of a file system using a portable storage device according to an exemplary embodiment of the present invention will be described.

Figure 5:
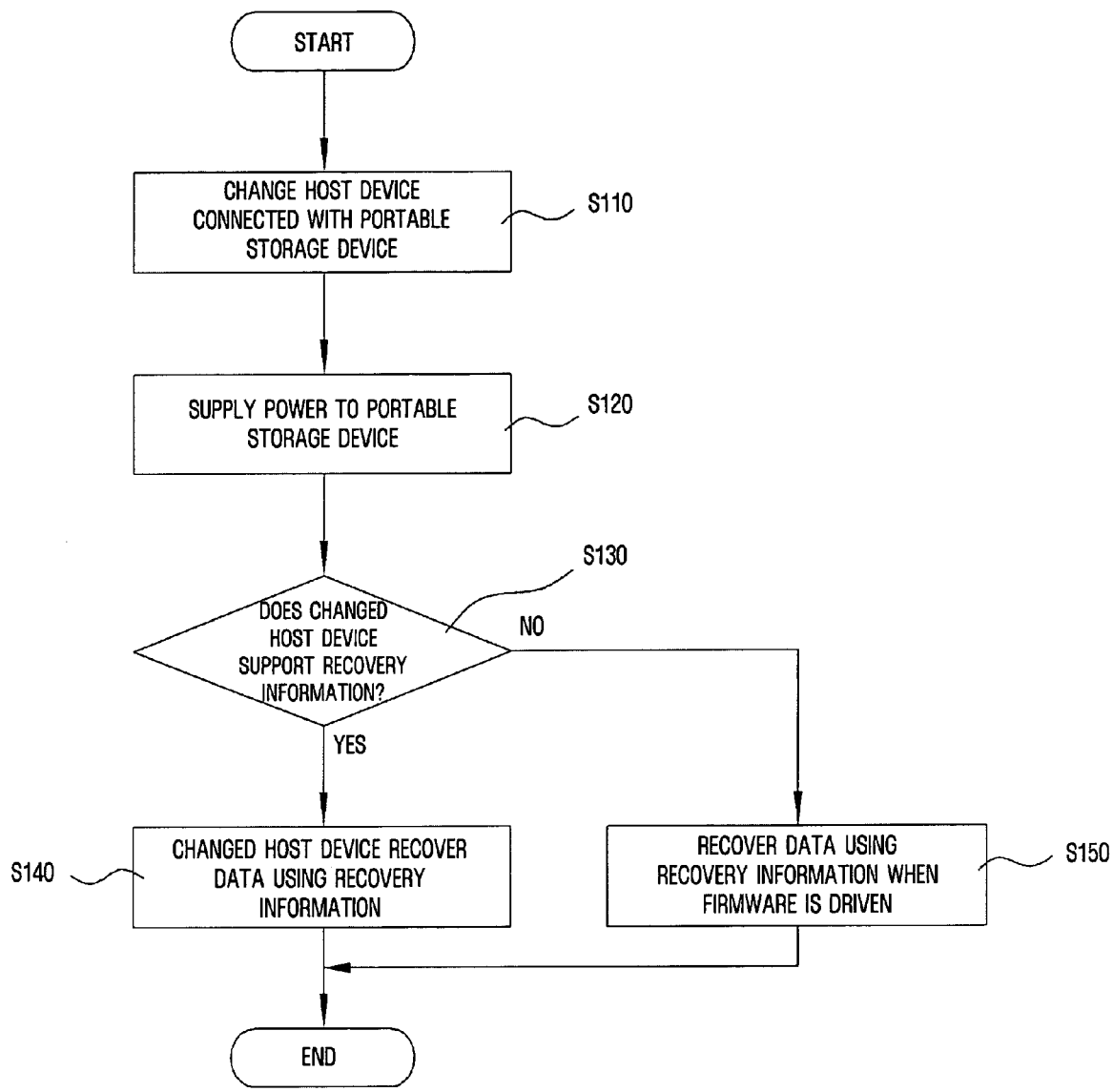
FIG. 5 is a flowchart illustrating a method for recovering a file system using a portable storage device according to an exemplary embodiment of the present invention.

FIG. 5 is a flowchart illustrating a method for recovering a file system, thereby recovering the integrity of the file system, using a portable storage device according to an embodiment of the present invention.

Figure 2:
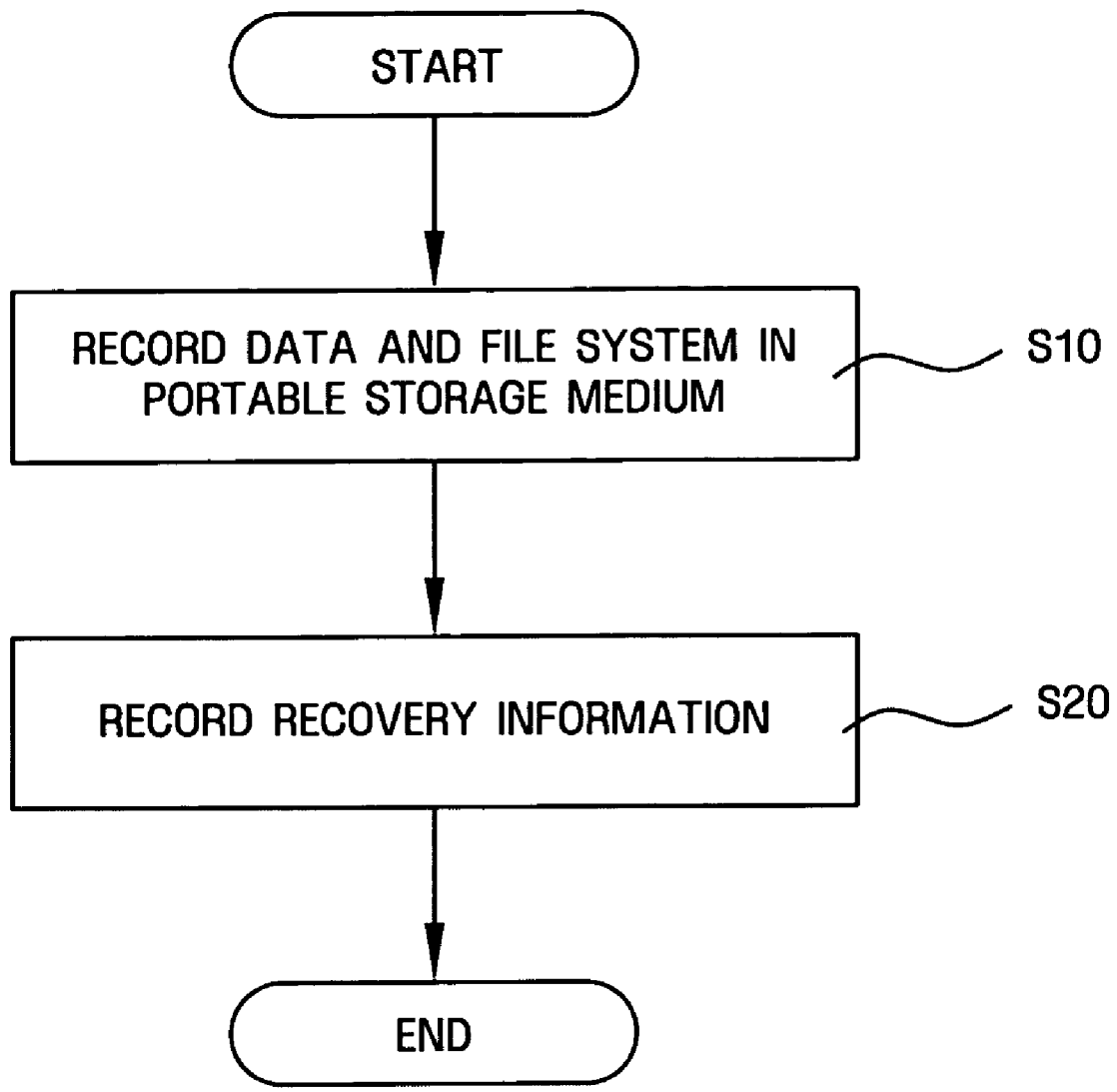
FIG. 2 is a flowchart illustrating a method for recording recovery information in a portable storage medium by a host device according to prior art.

Referring to FIG. 5, after the portable storage device 100 is connected to a predetermined host device and data, a file system and recovery information are recorded in the portable storage device 100, the portable storage device 100 is connected to another host device in step S110. At this time, the data, the file system, and the recovery information may be recorded in the portable storage device 100 using the method shown in FIG. 2.

In the illustrative, non-limiting embodiment of the present invention, after the portable storage device 100 is connected to the first host device 210 and data, a file system and recovery information are recorded in the portable storage device 100, the portable storage device 100 is connected to the second host device 220. In addition, the integrity of the file system cannot be ensured when unexpected power supply interruption occurs prior to completion of a file system operation or the portable storage device 100 is separated from the first shot device 210.

Once the portable storage device 100 is connected to a new host device, i.e., the second host device 220, power is supplied to the portable storage device 100 in step S120. When the firmware of the portable storage device 100 is driven by the supplied power, an error generated in the file system of the portable storage device 100 is recovered using the recovery information stored in the memory unit 110, thereby securing the integrity of the file system in step S130.

Thus, when the portable storage device 100 is connected to a new host device, the integrity of the file system can be ensured regardless of whether the new host device supports the recovery information stored in the memory unit 110. Moreover, when the new host device supports the recovery information stored in the memory unit 110, the new host device can ensure the integrity of the file system using the recovery information stored in the memory unit 110.

For example, when the first host device 210 supports first recovery information and the second host device 220 supports second recovery information, the first recovery information is stored in the memory unit 110 because the first recovery information is recorded in the portable storage device 100 from the first host device 210. At this time, if the portable storage device 100 is connected to the second host device 220, the second host device 220 accesses data recorded in the portable storage device 100 without recovery of the file system because the second host device 220 does not support the first recovery information stored in the memory unit 110, damaging the recorded data.

Thus, if the second host device 220 does not support the first recovery information stored in the memory unit 110, the control unit 130 of the portable storage device 100 recovers an error generated in the file system of the portable storage device 100 using the first recovery information stored in the memory unit 110 when power is supplied to the portable storage device 100 and the firmware is driven by the supplied power, thereby securing the integrity of the file system.

As described above, according to the present invention, even when a host device connected to a portable storage device does not support recovery information stored in the portable storage device, the integrity of a file system can be ensured.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A portable storage device comprising:
a memory unit that stores first recovery information used to recover recorded data which integrity is damaged;
a determining unit that determines whether a second host device that accesses the recorded data supports the first recovery information to recover the recorded data; and
a control unit that selectively recovers the recorded data using the first recovery information based on a result of the determination when the portable storage device is connected to the second host device,
wherein the first recovery information is supported by a first host device to recover the recorded data, and the second host device supports second recovery information to recover the recorded data, and
wherein the first host device and the first recovery information are different from the second host device and the second recovery information, respectively.

2. The portable storage device of claim 1, wherein the recorded data comprises a file system that defines hierarchical structure of data stored in the memory unit.

3. The portable storage device of claim 2, further comprising a driving unit that drives predetermined firmware to recover an error that has occurred in the recorded data.

4. The portable storage device of claim 3, wherein the control unit allows the second host device that accesses the recorded data to recover the recorded data if the first recovery information is also supported by the second device for recovering the recorded data.

5. The portable storage device of claim 4, wherein if the first recovery information is not supported by the second device for recovering the recorded data, the control unit recovers the recorded data using the first recovery information by driving the predetermined firmware.

6. The portable storage device of claim 2, wherein at least one of the first and second recovery information comprises logging information and an image of the file system.

7. A method for recovering recorded data, which integrity is damaged, using a portable storage device, the method comprising:

determining whether a second host device that accesses the recorded data supports first recovery information to recover the recorded data; and recovering the recorded data using the first recovery information based on a result of the determination by selectively causing one of a portable storage device that stores the recorded data and the second host device to recover the recorded data when the portable storage device is connected to the second host device, wherein the first recovery information is supported by a first host device to recover the recorded data, and the second host device supports the second recovery information to recover the recorded data, and wherein the first host device and the first recovery information are different from the second host device and the second recovery information, respectively.

8. The method of claim 7, wherein the recorded data comprises a file system that defines hierarchical structure of data stored in the memory unit.

9. The method of claim 8 further comprising causing predetermined firmware to recover an error that has occurred in the recorded data.

10. The method of claim 9, wherein the recovering comprises, if the second host device supports the first recovery information, recovering the recorded data by causing the second host device to recover the recorded data using the first recovery information.

11. The method of claim 10, wherein the recovering comprises, if the second device does not support the first recovery information, recovering the recorded data by causing the portable storage device to recover the recorded data using the first recovery information by driving predetermined firmware is driven.

12. The method of claim 8, wherein at least one of the first and second recovery information comprises logging information and an image of the file system.

* * * * *